(12) United States Patent
Vandenhende

(10) Patent No.: US 8,338,563 B2
(45) Date of Patent: Dec. 25, 2012

(54) METHOD FOR PURIFYING A PLASTIC SOLUTION

(75) Inventor: Bernard Vandenhende, Leest (BE)

(73) Assignee: Solvay (Societe Anonyme), Brussels (BE)

( * ) Notice: Subject to any disclaimer, the term of this patent is extended or adjusted under 35 U.S.C. 154(b) by 547 days.

(21) Appl. No.: 11/719,255

(22) PCT Filed: Nov. 15, 2005

(86) PCT No.: PCT/EP2005/055968
§ 371 (c)(1),
(2), (4) Date: Sep. 21, 2007

(87) PCT Pub. No.: WO2006/051116
PCT Pub. Date: May 18, 2006

(65) Prior Publication Data
US 2009/0124715 A1 May 14, 2009

(30) Foreign Application Priority Data
Nov. 15, 2004 (FR) .................................... 04 12092

(51) Int. Cl.
*C08F 6/00* (2006.01)

(52) U.S. Cl. .................... 528/502 D; 528/499; 528/500; 528/501; 528/502 R; 528/502 A; 521/40; 521/45; 521/46.5; 494/46; 494/52; 494/53

(58) Field of Classification Search ............... 521/40, 521/40.5, 46.5, 48, 41, 42, 42.5, 46, 48.5; 528/500, 501, 480, 499, 502 R, 502 A, 502 D, 528/502 E, 503; 494/15, 46, 53, 62, 67, 70, 494/82, 84
See application file for complete search history.

(56) References Cited

U.S. PATENT DOCUMENTS

| | | | |
|---|---|---|---|
| 3,228,592 A | 1/1966 | Shapiro | |
| 4,038,219 A * | 7/1977 | Boehm et al. | 521/46.5 |
| 4,071,479 A * | 1/1978 | Broyde et al. | 521/46.5 |
| 4,734,484 A | 3/1988 | Alfes et al. | |
| 5,317,043 A | 5/1994 | Gass | |
| 5,364,335 A * | 11/1994 | Franzen et al. | 494/15 |
| 2003/0032540 A1 | 2/2003 | Stroucken et al. | |
| 2005/0010027 A1 | 1/2005 | Vandenhende et al. | |
| 2006/0173085 A1 | 8/2006 | Fassiau et al. | |
| 2006/0173086 A1 | 8/2006 | Fassiau et al. | |

FOREIGN PATENT DOCUMENTS

| | | |
|---|---|---|
| EP | 0 945 481 | 9/1999 |
| EP | 1 057 854 | 12/2000 |
| EP | 1 096 323 | 5/2001 |
| EP | 1232204 | 8/2002 |
| FR | 2 796 750 | 1/2001 |
| FR | 2 868 782 | 10/2005 |
| JP | 6-269697 | 9/1994 |
| JP | 2000-226469 | 8/2000 |
| JP | 2003-144974 | 5/2003 |
| WO | 82 02543 | 8/1982 |
| WO | 01 70865 | 9/2001 |
| WO | 03 054064 | 7/2003 |
| WO | 2004 013204 | 2/2004 |

OTHER PUBLICATIONS

Van Krevelen D. W., "Properties of Polymers", pp. 200-202, 1990.

(Continued)

*Primary Examiner* — Frances Tischler
(74) *Attorney, Agent, or Firm* — Oblon, Spivak, McClelland, Maier & Neustadt, L.L.P.

(57) ABSTRACT

Method for purifying a solution of at least one plastic in a solvent, the said solution comprising insolubles, whereby the solution is purified using a centrifugal settler.

17 Claims, 1 Drawing Sheet

OTHER PUBLICATIONS

Brandrup, J. et al., Editors, "Polymer Handbook", pp. IV-337 to IV-359, Second Edition.
U.S. Appl. No. 11/578,347, filed Oct. 12, 2006, Vandenhende.
U.S. Appl. No. 11/578,522, filed Oct. 16, 2006, Vandenhende, et al.
U.S. Appl. No. 11/719,825, filed May 21, 2007, Fassiau, et al.
U.S. Appl. No. 11/719,714, filed May 18, 2007, Fassiau, et al.
U.S. Appl. No. 12/677,906, filed Mar. 12, 2010, Lepers, et al.
U.S. Appl. No. 12/063,710, filed Feb. 13, 2008, Fassiau, et al.
U.S. Appl. No. 12/990,929, filed Nov. 3, 2010, Van Weynbergh, et al.

* cited by examiner

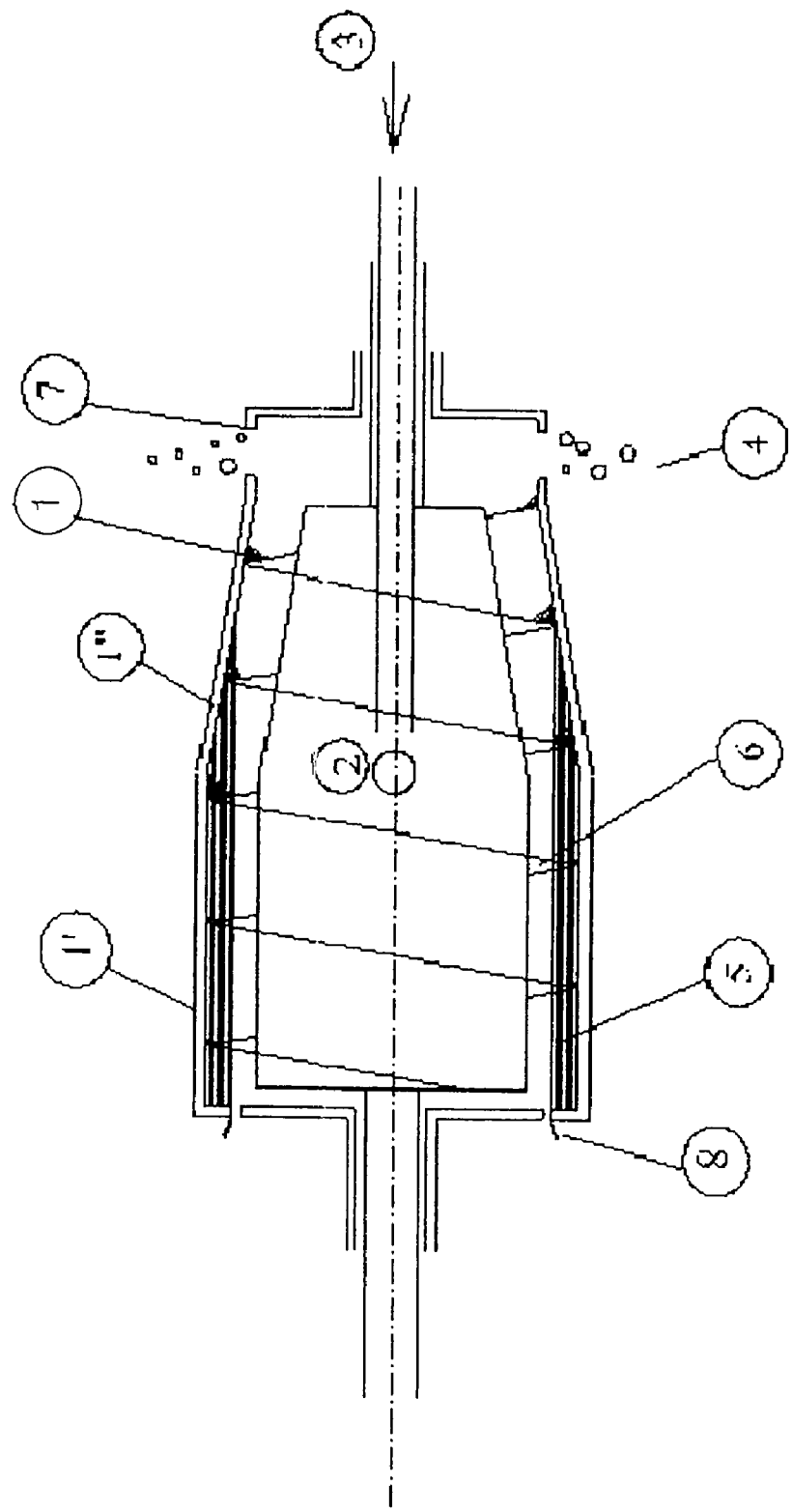

METHOD FOR PURIFYING A PLASTIC SOLUTION

This application is a 371 of PCT/EP05/55968 filed Nov. 15, 2005.

The present invention relates to a method for purifying a plastic solution, and to a recycling method using the same.

Plastics are abundantly used in various forms, mainly in the solid state, to manufacture miscellaneous articles, flexible or rigid, such as, for example, tarpaulins, coated fabrics and other elements for vehicle interior decoration, pipes, window frames and electrical cables with polymer insulation. However, at a given moment in their existence, it may happen that they are dissolved in a solvent from which they must be extracted. Thus, polymer solutions are obtained at the end of certain polymerization processes (called "solution polymerization"), during certain recycling methods, during the cleaning of certain installations for manufacturing polymer-based objects and paints, etc.

Thus, various plastic recycling methods based on dissolution in organic solvents have been proposed. Patent application EP 945481 in the name of the Applicant proposes, for example, a method for recycling an article based on at least one vinyl chloride polymer whereby:
(a) the article is shredded into fragments with an average size of 1 cm to 50 cm if it exceeds these dimensions;
(b) dry article fragments are contacted with a substantially anhydrous solvent capable of dissolving the polymer, forming an azeotrope with water (preferably MEK);
(c) the polymer dissolved in the solvent is precipitated by injecting steam into the solution thus obtained, thereby also causing the entrainment of the solvent-water azeotrope and leaving a mixture essentially consisting of water and solid polymer particles;
(d) the polymer particles are collected.

Most methods for recycling plastic articles by selective dissolution/precipitation have a common problem: the undesirable insolubles must first be removed before precipitating the plastic.

Thus, for example, in the above application EP 945481, it is recommended to use a fabric or screen with meshes of about 0.1 to 10 mm in size (in practice, 125 micron meshes are used, even 100 microns or 70 or 50 microns). However, the Applicant has found that such filters lead to clogging problems, requiring the installation to be frequently shut down for cleaning, which is particularly problematic in the case of a continuous method.

These problems are probably due to the particle size distribution. In fact, the usual wastes may contain coarse particles of other products such as plastics other than the one concerned, rubber, glass or PET fibres, metal particles, etc., which are up to 10 to 5 mm, in size. They also generally contain pigments, fillers, stabilizers, etc., of about 0.1 to 100 micron in size. In fact, it is difficult to remove these two populations of particles together, because the finer the filtration mesh, the slower the filtration rate and simultaneously, the number (and not necessarily the mass) of particles removed (retained on the filter) increases very significantly.

A similar problem (undesirable clogging) has been encountered with other types of filters (wedge wire and others) as well as with centrifugation of the solution. Moreover, simple settling is unsuccessful with solutions of plastics which, if left too long without stirring, often tend to form gels.

The Applicant accordingly had the idea of testing an apparatus called a "centrifugal settler" mainly used for liquid/solid separation in the food and chemical industry (preparation of olive oil; purification of water and effluents from certain industries, etc.). It was basically uncertain whether this type of apparatus could be used with solutions of (relatively viscous) plastics. The Applicant has however found that not only is this type of apparatus perfectly suitable and capable of remedying the abovementioned clogging problems, but also, it provides unexpected advantages: better mechanical properties of the plastic precipitate: lower residual plastic content in the filtrate and hence, rinsing economy.

In consequence, the present invention relates to a method for purifying a solution of at least one plastic in a solvent, the said solution comprising insolubles, whereby the solution is purified using a centrifugal settler.

The plastic concerned by the present invention may be of any type. It may be an apolar polymer, such as a polymer ethylene (PE) or propylene polymer (PP); styrene polymers such as PS (polystyrene) or ABS (acrylonitrile-butadiene-styrene terpolymer). It may also be a polar polymer such as a vinyl chloride polymer (PVC) or vinylidene chloride polymer (PVDC), or a copolymer of ethylene and polyvinyl alcohol (EVOH), It may also be a blend of such plastics of which at least one is in solution. Good results have been obtained with PVC. PVC means any homopolymer or copolymer containing at least 50% by weight of vinyl chloride.

Before its dissolution, the plastic may be in any for whatsoever. It may, for example, consist of polymerization, compounding or processing scrap, possibly in the liquid or pasty state, possibly even in solution in a solvent. It may also consist of solid articles (in the form of flexible or rigid pipes, containers, sheets for flooring, tarpaulins, window frames, electric cable insulation sheaths, etch), comprising one or more common additives such as, for example, plasticizers, stabilizers, antioxidants, fire retardants, pigments, filler materials, etc., including reinforcing fibres. These fibres may be of any type, natural or synthetic; it is possible to use fibres of glass, cellulose or plastic, such as polyester fibres and, in particular, polyethylene terephthalate (PET) fibres.

The insolubles contained in the solution (and generally present in the abovementioned articles) may be reinforcements (fibres, miscellaneous fillers), "accessories" such as metal eyelets, labels, metal conductors, etc.; plastics of another type, etc. Thus, for example, electric cable waste generally contains PVC, other plastics, and copper; roofing membrane waste generally comprises PVC and PET fibres; pharmaceutical blister pack waste generally comprises several different plastics (typically PVC and PE), which are not soluble in the same solvents; wallpaper waste often contains PVC and paper, etc. By definition, these insolubles are present in the form of solid particles in solution, In a method in which the choice of solvent capable of dissolving the plastic is unrestricted (recycling method, for example), the solvent is preferably selected from liquids having a solubility parameter (a definition and experimental values of which are given in "Properties of Polymers", D. W. Van Krevelen, 1990 edition, pp.200-202, and in "Polymer Handbook", J. Brandrup and E. H. Immergut, Editors. Second Edition, p. IV-337 to IV-359) close to the solubility parameter of the plastic to be dissolved and/or having strong interactions therewith (hydrogen bonds, for example). The term "close" is generally equivalent to "not deviating by more than 6 units". It is generally an organic solvent, preferably a polar one such as MEK (methyl ethyl ketone), that yields good results with many polymers and, in particular, with halogenated polymers such as PVC. It is understood that solvent means both single substances and mixtures of substances. In particular, in the case of a continuous and/or closed-loop recycling method, the solvent may be a stream of recycled liquid and may contain a certain quantity of non-solvent.

According to the invention, the insolubles are separated from the solution of plastic by settling in a centrifugal settler. By definition, this apparatus combines the application of two different forces which both depend on the density of the substances to be separated: gravitational force and centrifugal force. Such apparatus are marketed in particular by Alfa Laval, Pieralisi, Bird, Broadbent Siebtechnik and others.

A schematic diagram of such an apparatus is appended to the present application FIG. 1). Such an apparatus generally comprises a rotating housing or bowl (1) having a cylindrical portion (1') and a conical portion (1"), as well as a screw (2) concentric with the housing (1), rotating in the same direction but at a lower speed.

In this type of apparatus, the solution to be purified is generally fed via a fixed tube (3), located near the axis of rotation. The centrifugal force generated by rotation immediately causes the heavier insolubles (4) to settle towards the periphery and a purified solution (5) to migrate towards the centre (axis). Since the clearance between the bowl and the screw (2) is very small, the exterior of the rotor (6) scrapes off and conveys the insolubles which settle towards an outlet orifice (7), located near the end of the conical portion of the housing. The purified solution is withdrawn at the opposite end, by overflow through a dedicated orifice (8). Other configurations also exist: co-current machine, counter-current machine, vertical machine, etc. As a matter of fact, a vertical machine is preferred since at transition points in the process (like starts and stops), it makes the solid recuperation easier. Additionally, a vertical design allows to fix the axis of the machine only at one point (namely the top), which is better in terms of vibration damping and leak tightness. Hence, a process using a vertical machine is more stable.

The parameters that a person skilled in the art can optimize on this type of apparatus according to the desired result (solution purity and residual solution content of the filtrate) are mainly the respective speeds of the bowl and the screw, the feed rate of the solution to be purified and the liquid height. The choice of the geometry and dimensions of the apparatus is obviously also crucial (diameter and length of the cylindrical portion, length of the conical portion and slope angle; space between the exterior of the rotor and the interior of the bowl which determines the discharge rate, etc.).

It appears from the operating mode of this type of apparatus that its purifying capacity (separation of the insoluble particles and of the solution) is directly proportional to the density difference between the two (liquid/solid) and inversely proportional to the viscosity of the solution. In consequence, in certain cases, it may be advantageous to add a cosolvent and/or a phase separation agent to the solution (as described in application WO 01/70865 in the name of the Applicant and of which the content for this purpose is introduced by reference in the present application) which must therefore be selected according to its ability to reduce the density and/or viscosity of the solution, while preserving or increasing its plastic dissolution capacity.

The solution to be treated by the process of the invention may contain some water for different reasons. It could for instance be a solution involved in a dissolution/precipitation process using water as precipitation agent (like the one described in EP 945481). Moreover, numerous plastic wastes contain a non-negligible quantity of water, which is therefore also found in the solution to be purified. The presence of a phase separation agent may also be beneficial from this standpoint, if selected from substances capable of making the solution more hydrophobic. In the case of polar organic solvents, phase separation agents (or cosolvents) suitable rom this standpoint are apolar organic solvents. Particularly suitable are aliphatic hydrocarbons with 5 to 7 carbon atoms. If the solvent is MEK, excellent results have been obtained by selecting n-hexane as phase separation agent. As stated above, this also serves to reduce the density and viscosity of the solution. These two parameters are in fact adjustable according to the composition of the solution.

In the method according to the invention, the centrifugal settling preferably takes place at a temperature above ambient temperature, but lower than the boiling of the solution at the settling pressure. This parameter must therefore be determined according to the plastic/solvent combination selected. Preferably, especially for solvents that have a boiling point much lower than the polymer thermal degradation temperature, the temperature during centrifugal settling is preferably close to that of the boiling point of the solution, while just not reaching it (i.e. it is preferably almost equal to this temperature at the working pressure, which means it is lower by maximum 1 or 2° C.). In the case of a PVC compound (i.e. a PVC formulation with usual additives like stabilizers, charges, pigments. dissolved in a mixture of MEK (80% by weight), hexane (15%), and water (5%), the insolubles may be separated after flash/expansion of the medium at atmospheric pressure (dissolution taking place under pressure at 100° C., far above the boiling temperature at atmospheric pressure) and at a temperature of 65 to 69° C. (the boiling temperature of the mixture nor ally being 69° C. at atmospheric pressure but the composition of the mixture having changed during the flash). Alternatively, the settling (insoluble separation) may take place at the dissolution conditions, for instance under 100° C. and 2 bar relative pressure (3 bar absolute pressure).

In consequence, in a batch method and/or before starting a continuous method using centrifugal settling according to the invention, the apparatus is preferably preheated. This preheating preferably takes place with a virgin solution, free of plastic, but with a similar composition to avoid disturbing the smooth operation of the method.

The pressure during the filtration step (centrifugal settling), may or may not be higher than atmospheric pressure. Operation at atmospheric pressure reduces the apparatus investment. However, working under pressure allows for substantial operating savings, particularly if the method according to the invention is part of a method in which the solution is already available under pressure. In fact, in a recycling method, for example, the dissolution step generally takes place at a pressure above the ambient pressure, Subjecting the solution to a flash (that is, a sudden pressure reduction) needlessly consumes solvent and concentrates the solution, thereby increasing its density and viscosity, which is unfavorable. A solution under higher pressure and temperature generally has, at equal plastic concentration, a reduced viscosity and a lower density. It is therefore processed more easily since the settling speed is directly proportional to the difference between the density of the solid particles and the one of the solution (said difference thus increasing if the density of the solution decreases) and inversely proportional to the viscosity of the solution (Stokes relation).

As a conclusion centrifugal settling preferably occurs.
  under pressure and at a temperature which exceeds the boiling temperature of the solvent at atmospheric pressure; and/or
  at a temperature almost equal to the boiling temperature of the solution at the settling pressure.

In a process where plastic dissolution is applied on purpose (for instance, in a plastic recycling process using dissolution/precipitation of the plastic), it allows lower energy consumption since less solvent needs to be eliminated for a given amount of plastic treated (since the solution is more concentrated). As a matter of fact, using the above mentioned example of the PVC compound dissolved in a mixture of MEK (80% by weight), hexane (15%), and water (5%), when settling after flash/expansion of the medium at atmospheric pressure, the compound concentration in the outcoming solution (centrate) during set settling is limited to about 20 kg of compound per 100 kg of solvent, i.e. 5 kg of solvent for 1 kg of compound. While when working under pressure (2 bar relative—3 bar absolute), the compound concentration may be increased to at least 25 kg per 100 kg of solvent, i.e. 4 kg of solvent for 1 kg of compound so that 20% less solvent needs to be eliminated.

The centrifugal settling according to the invention hence yields two distinct products: solid particles (or insolubles), and the purified solution.

The solid particles generally contain residual solvent in a few % by weight or a few tens of %. They are therefore preferably subjected to purification to substantially strip of these residues (for example, to reach residual solvent contents of 50 to 100 ppm (parts per million by weight)). Steam stripping is particularly suitable for this purpose.

As to the purified solution (purified by centrifugal settling) it may, depending on each case, be used as it is or be subjected to additional filtration before use (as it is, or to precipitate the plastic). In fact, it is not uncommon for certain solids to be subjected to flotation and/or swelling during the method, and to be extracted with the solution and not with the solids. However, this procedure is not systematic and since the quantity of solids concerned is small, they can be removed easily from the filter by scraping (wiping).

The method according to the present invention can be incorporated into any method involving the recovery of a plastic from a solution. In particular, it can form part of a method for recycling plastics by dissolution/precipitation.

A major advantage of the method according to the present invention is that it can operate continuously. In consequence, it is preferably incorporated in a continuous method using the purified solution or, at least, in a semi-continuous method in which at least the centrifugal settling step is continuous. In the case of a plastic recycling method by dissolution/precipitation, the continuous/semi-continuous character of the method essentially depends on the precipitation mode selected:

in the case of azeotropic distillation of the solvent (and of the phase separation agent, if applicable; see in particular applications EP 945481, EP 1232204 and WO 01/070865 in the name of the Applicant), it is generally a semi-continuous method; this mode preferably uses water as precipitation agent (as in the afore mentioned applications), since water is quite ecological and has a solubility parameter very different from the one of most common polymers, in the case of spray drying (as in application WO 03/05464 also in the name of the Applicant) or of devolatilization (as in application FR 04.03856 also in the name of the Applicant), it may be a continuous method.

Whether the method is continuous or semi-continuous, it operates preferably in a closed loop, with effluent recycling.

Since MEK, water and hexane are ideal reagents for recycling PVC in a closed loop (see in particular the above application WO 01/070865), centrifugal settling according to the invention is preferably incorporated in a PVC recycling method by dissolution using an effluent mainly comprising MEK, water and hexane. In this case, since the total water content of the medium is generally at least 5% (by weight) a hexane content of at least 15% should be selected (it is being understood that the rest of the medium consists of MEK) in order to obtain an MEK-rich phase capable of dissolving the PVC over an acceptable temperature range.

The present invention is illustrated in a non-limiting manner by the tests described as examples below, in which certain experimental details and the results obtained are given in Tables 1 to 3 below.

Procedure for Table I

The test campaign involved the following steps:
1. A waste containing 25 kg of plasticized PVC from various sources (see Table) was dissolved in 100 kg of solvent consisting (by weight) of 80% MEK, 15% hexane and 5% water at the temperature given in the Table; the various solutions obtained were fed to a centrifugal settler similar to the one in FIG. 1, working at atmospheric pressure and having separately adjustable housing and screw speeds, allowing flexible use.
2. The insolubles and the purified solution were collected separately.
3. Samples of the purified solution were analyzed to determine the residual content of insolubles, and the PVC was then precipitated by the injection of steam (and of an auxiliary liquid, as taught in the above applications/patents in the name of the Applicant).
4. The PVC obtained was dried and its tensile strength determined according to the following standards and under the following conditions: ISO 527-1 and ISO 527-2 (1993) 23° C. 50% RH
   for plasticized PVC (cable, roofing, flooring waste, mixture of a cultural film and wallpaper): 250 mm/min
   for rigid PVC (blister waste, sawdust): 5 mm/min Wastes Used for the Tests
1. Cables: low-voltage and telecom cable waste comprising PVC and metal, rubber PE, etc.
2. Blister packs: waste comprising PVC and PE.
3. Roofing (roofing membranes): waste comprising PVC, PET fibres and sand.
4. Flooring: idem+glass fibres and other polymers.
5. Mixture of agricultural films/wallpaper: waste comprising PVC and paper.
6. Sawdust (from window frames) waste comprising PVC and sand, metal, glass etc.

Comparative Tests (Table 2)

The comparative tests shown in Table 2 were performed under similar conditions, but by simple filtration of the solution (on filter with mesh sizes indicated) before precipitation and not by centrifugal settling.

Results Obtained

Tables 1 and 2 show that the method according to the invention serves to increase the tensile strength and ductility of the PVC obtained. It also helps to decrease the residual Cl content of the insolubles.

And finally, it helps reducing the content of charges (like calcium carbonate).

Comparative Tests (Table 3)

The comparative tests shown in Table 3 were performed on a same solution of a PVC wire & cable compound containing about 17% insolubles (among which CaCO3), and consisting in 30 kg of compound dissolved in 100 kg of solvent. These tests were performed using 2 different apparatus:
A. a vertical settler working under a pressure of 3 bar (test according to the invention); and
B. a regular wedge-wire filter in a 2-stage filtration with 125 μm and 100 μm mesh size respectively (comparative test).

The results obtained clearly show that the solution purified using the vertical settler contains less insolubles and show better mechanical properties than the one purified by mere filtration.

TABLE 1

| Type of waste | Cables 1 | Cables 1 | Cables 2 | Blisters 1 | Blisters 2 | Roofing | Flooring | Wallpaper-agricultural film | Sawdust |
|---|---|---|---|---|---|---|---|---|---|
| Insolubles (% by weight) | 10.4 | 10.4 | 6.1 | 2.0 | 2.2 | 0.7 | 1.2 | 5.0 | 1.2 |
| Ca content (% by weight) (*) | 9 | 10 | 9 | | | | | | |
| Centrifugal force (g) | 1513 | 1513 | 2012 | 2750 | 2750 | 2704 | 1513 | 2704 | 2704 |
| Solution temp. (° C.) | 58 | 58 | 54 | 50 | 45 | 50 | 50 | 50 | 50 |
| Filtered solution density (g/dm$^3$) | 831 | 831 | 831 | 798 | 818 | 831 | 831 | 831 | 818 |
| Residual insolubles in solution (%) | 0.41 | — | 0.23 | 0.09 | 1.01 | 0.04 | 0.01 | 0.1 | 0.03 |
| PVC Shore A hardness | 87 | 87 | 88 | 75 | | 84 | 88 | 83 | 75 |
| PVC density (g/dm$^3$) | 1412 | 1431 | 1417 | 1348 | | 1301 | 1375 | 1302 | 1448 |
| Tensile strength: elongation at break (%) | 305 | 297 | 309 | 108 | | 348 | 265 | 293 | 95.5 |
| Tensile strength: breaking stress (MPa) | 16.8 | 16.7 | 18.7 | 42.1 | | 19.8 | 19.2 | 18.7 | 40.4 |

(*) measured by X-ray fluorescence

TABLE 2

| Type of waste | Cables 1 | Cables 1 | Cables 2 | Blisters 2 | Roofing 2 | Flooring | Wallpaper | Sawdust |
|---|---|---|---|---|---|---|---|---|
| Filter mesh (μm) | 75 | 125 | 125 + 70 | 125 + 70 | 125 + 70 | 125 + 70 | 125 + 70 | 125 + 70 |
| PVC Shore A hardness | 89.7 | 89 | 90.7 | 72.7 | 89.3 | 89.7 | 85.3 | 74.7 |
| PVC density (g/dm$^3$) | 1456 | 1487 | 1473 | 1339 | 1343 | 1522 | 1396 | 1461 |
| Ca content (% by weight) (*) | 12 | 13 | 11 | | | | | |
| Tensile strength: elongation at break (%) | 265 | 260 | 244 | 83 | 240 | 195 | 243 | 50 |
| Tensile strength: breaking stress (MPa) | 14.6 | 14.5 | 16.3 | 37.1 | 17.8 | 14.8 | 15.3 | 34.7 |

Legend:
(%) insolubles in solution fed to settler
def. break = deformation at break
breaking stress = breaking stress
(*) measured by X-ray fluorescence

TABLE 3

| | | Test Method A | Test Method B |
|---|---|---|---|
| G force | (g) | 2130 | 0 |
| Shore Hardness A | — | 80 | 81 |
| Density | kg/m3 | 1316 | 1418 |
| Mechanical properties | | | |
| Elongation at break | % | 353 | 277 |
| Stress at break | MPa | 16.92 | 1 |
| Insoluble content of purified solution (filtration 75 μm) | % by weight | 0.1 | 1.1 |
| Ca content (% by weight) (*) | % by weight | 4.9 | 11 |

(*) measured by X-ray fluorescence

The invention claimed is:

1. A method for purifying a plastic, the method comprising:
dissolving the plastic to be purified under pressure in a polar organic solvent to obtain a mixture of a solution of the plastic and insoluble materials;
adjusting at least one of density and viscosity of the plastic solution by adding an apolar organic solvent phase separation agent to the plastic solution mixture;
introducing the adjusted plastic solution mixture into a centrifugal settler;
subjecting the adjusted plastic solution mixture to gravitational and centrifugal force at a pressure above atmospheric pressure in the centrifugal settler such that the insoluble materials move to a periphery of the centrifugal settler, and settle to an outlet orifice at a settlement end of the centrifugal settler and a purified solution of the plastic migrates towards a center of the centrifugal settler and flows in an opposite direction to the settlement direction to an overflow end of the centrifugal settler;
controlling a level of the adjusted plastic solution mixture in the centrifugal settler to adjust an overflow rate to an effective degree of separation of the insoluble materials;
removing the purified plastic solution from the centrifugal settler by overflow through an overflow orifice; and
removing the insoluble materials from the centrifugal settler through the outlet orifice at the settlement end of the centrifugal settler;
wherein
the centrifugal settler comprises:
a housing or bowl having a cylindrical portion and a conical portion, rotating at a speed;
a screw concentric with the housing or bowl, rotating in a same direction as the housing or bowl but at a lower speed, and
an amount of the apolar organic solvent phase separation agent added is sufficient to reduce at least one of the density and viscosity of the plastic solution and, at the same time, preserve or increase its plastic dissolution capacity.

2. The method according to claim 1, wherein the centrifugal settler comprises a vertical housing and a rotation axis fixed only at the top of the housing.

3. The method according to claim 1, wherein the plastic solution further comprises water.

4. The method according to claim 1, wherein a temperature of the plastic solution in the centrifugal settler exceeds the boiling temperature of the solvent at atmospheric pressure.

5. The method according to claim 4, wherein the temperature is 1° C. or 2° C. less than the boiling temperature of the plastic solution at the pressure of the centrifugal settler.

6. The method according to claim 1, further comprising subjecting the removed insoluble materials to steam stripping.

7. The method according to claim 1, further comprising filtering the purified plastic solution after overflow through the overflow orifice.

8. A method for recycling a plastic, the method comprising the method according to claim 1 and selective dissolution/precipitation of the plastic.

9. The method according to claim 8, wherein
the method is continuous or semi-continuous, and
precipitation of the plastic comprises at least one operation selected from the group consisting of spray drying, devolatilization, and azeotropic distillation.

10. The method according to claim 8, wherein
the plastic is PVC and
the solution comprises MEK (methyl ethyl ketone) as solvent, hexane as phase separation agent, and water.

11. The method according to claim 10, wherein a content of the water of the solution is at least 5% by weight and a content of the hexane is at least 15% by weight.

12. The method according to claim 9, wherein
the plastic is PVC and
the solution comprises MEK (methyl ethyl ketone) as solvent, hexane as phase separation agent, and water.

13. The method according to claim 12, wherein a content of the water of the solution is at least 5% by weight and a content of the hexane is at least 15% by weight.

14. The method according to claim 1, wherein the plastic is PVC, the solvent is MEK (methyl ethyl ketone), and the phase separation agent is hexane.

15. The method according to claim 14, wherein the solution further comprises water, a content of the water of the solution is at least 5% by weight and a content of the hexane is at least 15% by weight.

16. The method according to claim 14, wherein the solution further comprises water.

17. The method according to claim 1, wherein a clearance between the housing or bowl and the screw is such that the screw scrapes off and conveys insolubles which settle toward the settlement outlet orifice, located near the end of the conical portion of the housing or bowl

* * * * *

UNITED STATES PATENT AND TRADEMARK OFFICE
CERTIFICATE OF CORRECTION

PATENT NO. : 8,338,563 B2  
APPLICATION NO. : 11/719255  
DATED : December 25, 2012  
INVENTOR(S) : Bernard Vandenhende Page 1 of 1

It is certified that error appears in the above-identified patent and that said Letters Patent is hereby corrected as shown below:

Column 9, Line 5, "ture is 1 °C. or 2 °C. less than the boiling temperature of the" should read -- ture is 1 °C or 2 °C less than the boiling temperature of the --

Signed and Sealed this  
Second Day of April, 2013

Teresa Stanek Rea  
*Acting Director of the United States Patent and Trademark Office*